Oct. 27, 1959  W. M. FLOOK, JR., ET AL  2,909,924
RADIATION TEMPERATURE MEASUREMENT
Filed Dec. 15, 1954
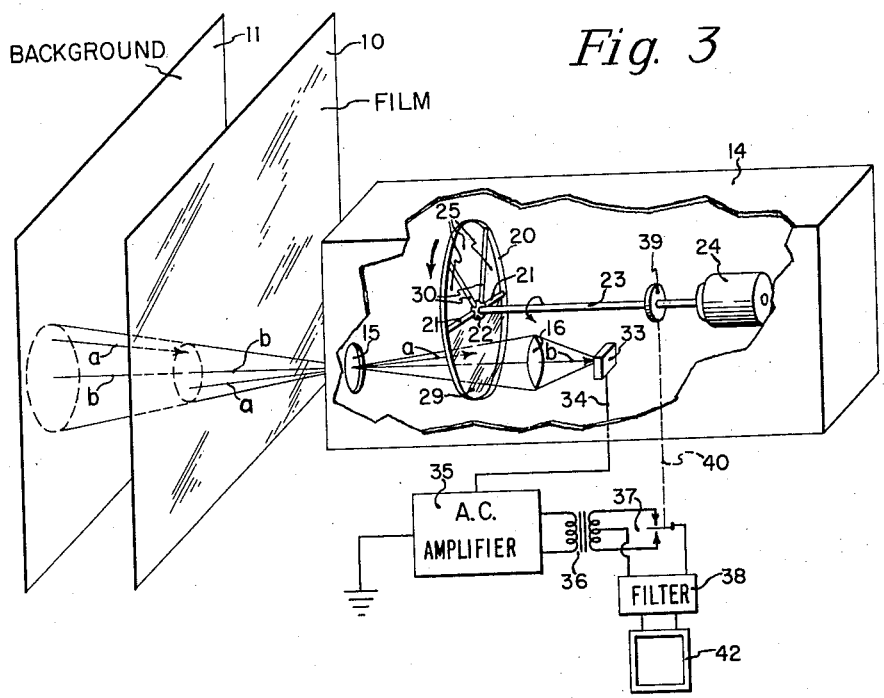
*Fig. 3*
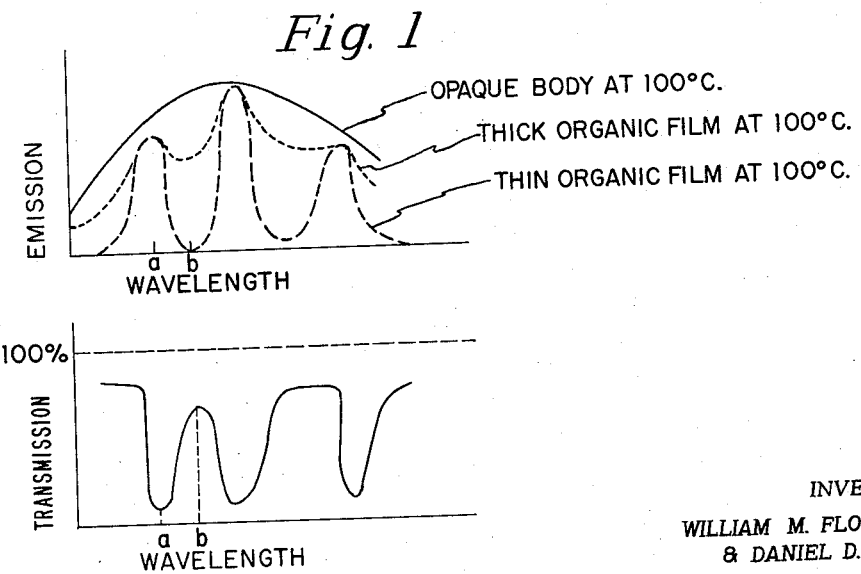
*Fig. 1*
*Fig. 2*
INVENTORS
WILLIAM M. FLOOK, JR.
& DANIEL D. FRIEL
BY  *Harry J. McCauley*
ATTORNEY United States Patent Office 2,909,924
Patented Oct. 27, 1959

2,909,924

RADIATION TEMPERATURE MEASUREMENT

William M. Flook, Jr., Wilmington, and Daniel D. Friel, Greenville, Del., assignors to E. I. du Pont de Nemours and Company, Wilmington, Del., a corporation of Delaware Application December 15, 1954, Serial No. 475,533

4 Claims. (Cl. 73—355)

This invention relates to the infrared radiation measurement of the temperature of hot semi-transparent materials, and particularly to the infrared radiation measurement of the temperature of hot semi-transparent films without necessity for physical contact with the film.

It is often desirable to determine accurately the temperature of hot semi-transparent films, such as cellophane, polymethylene terephthalate polyester film or the like, in the course of manufacture and, in modern methods of production, the measurement sought is frequently that of the temperature of a film moving at relatively high velocity. Much of the film is of very thin gage, ranging down to about 0.00025" thickness, and the risk of marring the film surfaces, particularly at the higher temperatures prevailing during manufacture, as well as the difficulty of maintaining intimate contact with the film, preclude measuring instruments which depend for their operation upon physical contact therewith. Infrared radiation methods for temperature measurement have hitherto proved impracticable, due to the fact that the emissivity of semi-transparent films varies substantially with film thickness and consequently is not a pure function of absolute temperature, semi-transparent materials differing in this respect from opaque materials.

A primary object of this invention is to achieve the accurate infrared radiation measurement of film temperature without necessity for physical contact with the film. Among the other objects of this invention are the provision of an economical and dependable apparatus for the infrared radiation measurement of film temperature, the provision of apparatus having a quick response characteristic for the measurement contemplated and the achievement of infrared radiation temperature measurement with complete elimination of environmental interference.

The manner in which these and other objects of this invention are attained will become apparent from the following detailed description together with the drawings, in which:

Fig. 1 is a typical plot of infrared radiation emission at a temperature of 100° C. as a function of wave length for organic materials, such as thin and thick polymethylene terephthalate polyester films, the emission curve of an opaque body being included for purposes of comparison, Fig. 2 is a plot of infrared radiation transmission as a function of wave length for organic materials, derived from the plot of Fig. 1, and Fig. 3 is a schematic representation of a preferred embodiment of apparatus adapted to measure the temperature of a semi-transparent film according to this invention, the detector housing being shown cut-away to reveal components enclosed therewithin.

Generally, the objects of this invention are attained by viewing the hot semi-transparent film under investigation with a suitable infrared radiation detector maintained at a substantially constant reference temperature, while alternately interposing and withdrawing across the radiation path a filter, also maintained at a substantially constant temperature, consisting of a layer of material having infrared absorption bands at substantially the same wave lengths as those of the film material and having a thickness such as to be substantially opaque to infrared radiation only in these bands, maintaining equality of radiation energy input to the detector as regards non-absorbed radiation regardless of whether the filter is interposed across the radiation path or not, and deriving a signal from the detector representative of the temperature of the film.

Radiation pyrometry depends for operation on the relationship between the temperature of a hot body and the characteristic radiant energy emitted by the body at each specific temperature. One difficulty encountered in temperature measurement according to this technique, however, is that the energy emitted is not solely a function of the ambient temperature of the object to be evaluated but depends upon the specific emissivity of the material constituting the object, which varies widely from unity, for the theoretical black body, to much lower values for materials of high reflectivity or transmissivity. When the objects examined are opaque, the radiation detectors employed can be provided with means correcting indication for deviation from ideality but, in the case of non-opaque materials, such as semi-transparent films, for example, the total emissivity is dependent also on film thickness. Thus, referring to Fig. 1, it will be seen that the average value of infrared emission for a film such as polymethylene terephthalate polyester film is considerably higher for a thick film than for a thin film at the same ambient temperature, namely, 100° C., and, consequently, it is not possible to evaluate temperature by conventional radiation pyrometry techniques.

Referring to Fig. 2, the transmission of infrared radiation through semi-transparent materials displays decided variation with wave length, certain wave lengths such as that represented by $a$ being substantially absorbed by the material while other wave lengths, for example $b$, are transmitted to a considerable extent. The emission for these representative wave lengths is exactly the converse of the transmission, as shown in Fig. 1, and in the "absorption bands" represented by a wave length $a$ and other wave lengths which have low orders of transmission, semi-transparent materials possess emissivities which approach the emissivity of an opaque body, the characteristic curve for which is drawn in for purposes of comparison in Fig. 1. Furthermore, the absolute values of emissivity are the same as these wave lengths, regardless of the thickness of the film.

This invention utilizes the relationship of transmission to emission at all wave lengths of radiation in the infrared region to effect the measurement of temperature of hot semi-transparent materials, such as films and the like. As hereinbefore set forth, temperature solely as a function of emission is ascertainable only at wave lengths at which the semi-transparent material displays emissions which are independent of thickness. As will be seen from Fig. 1, such wave lengths correspond to the infrared absorption bands. The radiant energy emitted from the film at all wave lengths other than those of the absorption bands constitutes, in effect, unavoidable interference for which it is necessary to compensate. This compensation we accomplish by periodically interrupting the radiation received from the material under examination with a shutter, or "chopper," which alternately allows passage of all wave lengths, including the types represented by both $a$ and $b$, and then only those of the type represented by $b$. The difference in radiation intensity at the detector, which is maintained at a substantially constant reference temperature, is therefore a measurement of type *a* radiation and, accordingly, of the temperature of the semitransparent material. In order to effect the precise radiation filtering necessary, we employ a chopper which comprises two portions, one of which is completely open, and thus transmissive of all radiation, while the other consists of a thin layer of material which is opaque substantially only to radiation falling in the absorption bands of the film material. The filtering portion of the chopper should thus be so chosen that its transmission outside the strong absorption band regions is as nearly 100% as possible, while still being as low as possible within these bands. Obviously, filters might consist of gaseous, liquid or solid phase materials retained in suitable containers carried by the chopper structure; however, we have found it convenient to merely employ a filter of material of the same composition as the film under examination, the filter being of the order of ¼ mil thick. It will be understood that the filter must also be maintained at a substantially constant temperature, although not necessarily at the same temperature as the detector.

A preferred embodiment of apparatus according to this invention utilizing a rotating chopper is shown in Fig. 3 wherein the film in process is represented at 10, while the background, which may be the wall of a heating duct or the like, is shown at 11. It will be understood that film 10 may be in continuous movement past the duct wall 11, and that the apparatus will then determine continuously the film temperature.

The radiation detector 33 must be maintained at a suitable reference temperature lower than the temperature of the film in process, a level of 70° F. being satisfactory, and temperature control is achieved by mounting the detector and associated equipment within housing 14, which is refrigerated by conventional means not shown. Housing 14, is constructed of a material such as metal, opaque to infrared radiation, and is provided with a radiation-transmitting window 15 on the wall facing the film in test which is fabricated from a substance transparent to infrared radiation, such as arsenic trisulfide or the like. A double convex lens 16, also of infrared radiation transparent substance, is interposed in line with window 15 and detector 33 at a distance focusing radiation on the detector, and a rotary chopper is provided for interception of the beam of radiation received from the film.

The chopper comprises a circular ring 20 which is provided with radial supporting struts 21 fixedly secured to a driving hub 22, which latter is keyed or otherwise attached to the drive shaft 23 of motor 24. Approximately one-half of the area within ring 20 is open, the regions making up the open expanse being designated at 25, which open area is hereinafter referred to collectively as the "open sector," while the remainder is covered by the filter 29 hereinbefore described consisting of material absorbing substantially only in the film substance absorption bands, the filter being preferably of the same composition as film 10. Filter layer 29 is desirably made of as thin a gage material as can be utilized, having regard for the physical strength requirements imposed by chopper rotation, since enhanced performance is thereby achieved, a thickness of ¼ mil having proved entirely satisfactory in service tests.

It is necessary to effect a close balance of the quantities of radiation transmitted by the open sector and the filter sector 29, since measurement according to this invention is achieved by cancellation of the effect of radiations transmitted equally well by each of the sectors of the chopper. It will be apparent from Fig. 2 that organic films do not, on the average, transmit all of the radiation of wave lengths not substantially absorbed. Accordingly, it is necessary to trim the open area of the chopper to an appropriate degree by providing adjustable opaque attenuators 30 in this sector, which elements may conveniently comprise additional radial struts. Attenuators 30 are proportioned so that the total radiations transmitted in regions outside of the strong absorption bands are equal for both sectors of the chopper. The dimensions of the attenuators may be resolved by techniques known to persons skilled in the art, such as from an examination of the infrared transmission curve for the material utilized as the filter 29, or from theoretical considerations based on total transmission measurements.

The infrared radiation detector 33 may be a commercially obtainable device, such as a model 82819/UMT Thermocouple, marketed by the Farrand Optical Company. Detector 33 is in electrical connection through lead 34 with A.C. amplifier 35 peaked at a frequency equal to the number of revolutions/second at which the shopper rotates, which frequency may be 13 c.p.s. in a typical case. The output of amplifier 35 is fed through inductive coupling 36 to the synchronous rectifier 37 and thence to smoothing filter 38. The amplifier and apparatus in circuit therewith is available as a commercial assembly (e.g. Perkin-Elmer Corp. Model 107) complete with motor 24 and cam 39 operating the rectifier through mechanical connection 40 indicated in broken line representation, but not including the chopper. The output signal from the amplifier circuit is supplied to recorder 42, which may be a Minneapolis-Honeywell Company, Brown Instrument Division, "Electronick" Recorder.

In operation, it will be understood that film 10 and background 11 may both be heated above room temperature and thus emit infrared radiation of wave lengths lying within the absorption bands of the film, which wave lengths are represented as a class by the designation *a* employed in Figs. 1–3. At the same time both film and background emit other wave lengths which are transmitted to a greater or lesser degree by film 10 and to the same degree by filter 29, these wave lengths being represented as a class by the designation *b*. The *a* type radiation emitted by background 11 is completely absorbed by film 10, and thus is not transmitted to detector 33 when either sector of the chopper is interposed across the radiation path in the course of rotation of the chopper by motor 24. However, *a* type radiation emitted by film 10 is transmitted without diminution through the open regions 25 of the chopper, but not through filter 29, which absorbs this radiation when the filter is interposed across the radiation path. All *b* type radiation, whether emitted by film 10 or background 11, is transmitted through both sectors of the chopper to approximately the same degree and thus constitutes a substantially constant radiation background. It will be understood that the quantities of energy radiated to the detector are a function of temperature, the emissivity plot of Fig. 1 being displaced along the ordinate axis an amount dependent on the existing film temperature. Thus, at temperatures above 100° C. the plots of Fig. 1 all lie higher than their positions represented for this temperature, but the absorption bands remain in precise location on the wave length abscissa axis regardless of temperature. The difference signal generated by detector 33, when the open regions 25 of the chopper lie across the radiation path over that when filter 29 is athwart the path, is therefore a direct measure of the radiation *a* emitted by film 10, and thus of the temperature of film 10.

Detector 33 generates an approximate square wave electrical signal which is passed to amplifier 35, the output of which is delivered to rectifier 37. The rectified signal from rectifier 37, after passage through filter 38, is delivered to recorder 42 as a substantially constant E.M.F. corresponding to film temperature, which actuates the recorder according to the magnitude of this signal input. The D.C. signal reading of recorder 42 is thus directly proportional to the temperature of film 10 and the recorder can be readily calibrated in terms of temperature for each composition of film which it is desired to evaluate.

For mechanical reasons an instrument having a rotary chopper construction is preferred but, of course, a linearly reciprocatory shutter is equally operable. The principle underlying this invention can be utilized by viewing the sample independently with two individual detectors, before one of which the filter is interposed while the radiation path of the other is left open, and obtaining a difference signal by connection of the detectors in an electrical bridge circuit, or in other ways, thereby eliminating the chopper. Utilization of more than one detector is disadvantageous from the standpoint of stability in operation, however, and the chopper embodiment is therefore preferred in practice. We have obtained good response characteristics and high accuracy in temperature measurement within a calibrated range of 80–120° C.; however, our apparatus is adapted to use at temperatures as low as 50° C. or below, although at some loss in sensitivity as the ambient temperature maintained inside housing 14 is approached.

From the foregoing, it will be understood that this invention permits the measurement of the temperature of semi-transparent materials without physical contact theewith and completely independent of material thickness, while at the same time eliminating the effects of background interference. This invention may be modified in numerous respects without departing from the essential spirit, wherefor it is intended to be limited only by the scope of the appended claims.

What is claimed is:

1. An infrared radiation temperature measuring apparatus comprising in combination a housing with interior maintained at a substantially constant reference temperature and provided with a radiation-transmitting window, a radiation detector within said housing facing said window, a shutter within said housing having an open portion and a filter portion consisting of an expanse of material having infrared absorption bands at substantially the same wave lengths as those of the material to be examined and a thickness such as to be substantially opaque only to infrared radiation in these bands, each said portion being of a size intercepting all radiation entering said housing through said window and said portions being proportioned relative to one another so that the total quantities of infrared radiation transmitted by each said portion at wave lengths not absorbed by said material to be examined are substantially equal, said shutter being disposed relative to said window and said detector so that individual ones of said portions intercept in sequence all radiation entering said window, means in sequence interposing individual ones of said portions of said shutter in sequence across the path of said radiation entering said housing, optical means between said window and said detector focusing said radiation entering said window on the sensitive element of said detector, and electrical temperature indicating means in circuit with the output terminal of said detector.

2. An infrared radiation temperature measuring apparatus comprising in combination a housing with interior maintained at a substantially constant reference temperature and provided with a radiation-transmitting window, a radiation detector within said housing facing said window, a rotary shutter within said housing provided with an open sector and a filter sector, each said sector being of a size intercepting all radiation entering said housing through said window, said filter sector consisting of an expanse of material having infrared absorption bands at substantially the same wave lengths as those of the material to be examined and having a thickness such as to be substantially opaque only to infrared radiation in these bands and said open and filter sectors being proportioned relative to one another so that the total quantities of infrared radiation transmitted by each said sector at wave lengths not absorbed by said material to be examined are substantially equal, said shutter being disposed relative to said window and said detector so that said sectors intercept in sequence all radiation entering said window, means for rotating said shutter, optical means between said window and said detector focusing said radiation entering said window on the sensitive element of said detector, and electrical temperature indicating means in circuit with the output terminal of said detector.

3. An infrared radiation temperature measuring apparatus according to claim 2 wherein said filter sector consists of material having the same chemical composition as said material to be examined.

4. An infrared radiation temperature measuring apparatus according to claim 2 wherein said electrical temperature indicating means comprises an A.C. amplifier in electrical circuit with the output terminal of said detector, a rectifier in electrical circuit with the output terminals of said A.C. amplifier and an electrical temperature indicator in electrical circuit with the output terminals of said rectifier.

References Cited in the file of this patent

UNITED STATES PATENTS

| | | |
|---|---|---|
| 2,442,298 | Liston | May 25, 1948 |
| 2,605,332 | Parsons | July 29, 1952 |
| 2,674,155 | Gibson | Apr. 6, 1954 |
| 2,690,078 | Phillips | Sept. 28, 1954 |
| 2,764,692 | Miller | Sept. 25, 1956 |
| 2,775,160 | Foskett et al. | Dec. 25, 1956 |